(No Model.)
A. &. E. LARROWE.
Animal Poke.
No. 229,618.  Patented July 6, 1880.
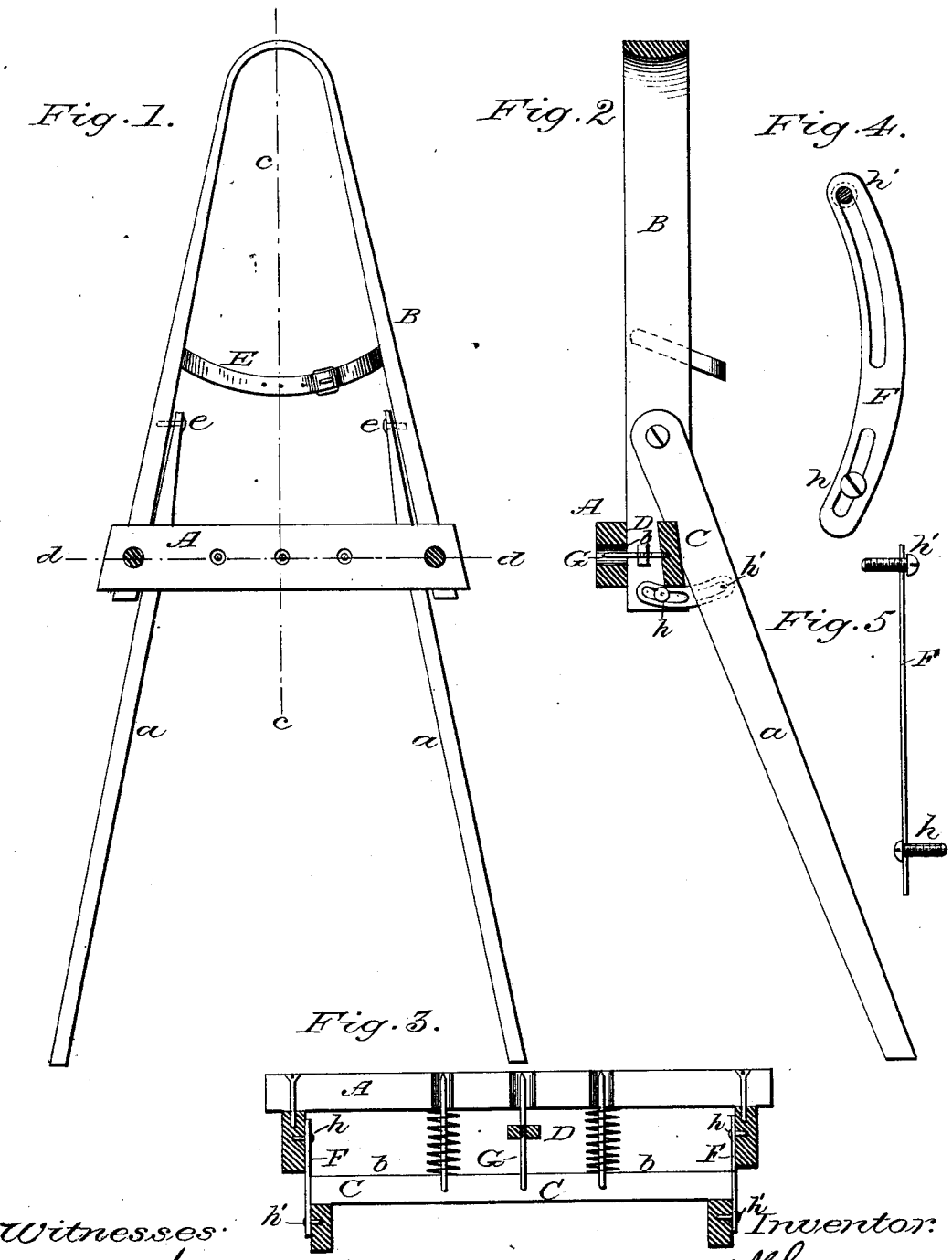
Witnesses  
Chas. Larrowe  
V. M. Larrowe
Inventor:  
A. Larrowe  
Erwin Larrowe

UNITED STATES PATENT OFFICE.

ALBERTUS LARROWE AND ERWIN LARROWE, OF COHOCTON, NEW YORK.

ANIMAL-POKE.

SPECIFICATION forming part of Letters Patent No. 229,618, dated July 6, 1880.

Application filed April 5, 1880. (No model.)

*To all whom it may concern:*

Be it known that we, A. LARROWE and ERWIN LARROWE, of Cohocton, in the county of Steuben, State of New York, have invented a certain new and useful Improvement in Animal-Pokes; and we do hereby declare that the following is a full, clear, and exact description thereof, reference being had to the accompanying drawings, and to the letters of reference marked thereon, which form a part of this specification.

Figure 1 represents a front view of our improved poke. Fig. 2 is a vertical section of the same on the line $c\ c$, Fig. 1. Fig. 3 is a transverse section on the line $d\ d$, Fig. 1. Figs. 4 and 5 represent a device for adjusting the frame carrying the pins.

Similar letters of reference indicate corresponding parts.

This invention relates to a new animal-poke with an adjustable frame carrying the pins, together with contrivances for adjusting and controlling the same.

The poke consists of a yoke or bow, B, shield-bar A, secured to the lower ends of the bow, an adjustable frame consisting of the cross-bar C, secured to the stales $a\ a$, and the stales pivoted to the bow at $e\ e$, and the throat-latch E.

From the cross-bar C project two short pins, $b\ b$, also a center one, G, on which a thread is cut, and provided with the nut D, for the purpose of controlling the movement of the frame carrying the pins. Coil-springs are placed around the pins $b\ b$, for the purpose of pressing the bars A and C apart. It will be seen that by moving this nut D on the pin G the amount of exposure of the pins will be regulated.

The adjusting device F (represented by Figs. 4 and 5) consists of two pieces of metal and screws $h$ and $h'$, slotted on a circle, as shown, to allow it to move freely on screws $h'$ when the poke is brought into action by the animal pressing it against the fence, &c.

The screws $h$, when tightened, rigidly secure the slotted irons to the lower ends of the bow, while it works loosely on the screws $h'$, which controls the outward movement of the frame carrying the pins, and by loosening the screws $h$ a trifle the distance between the bars A and C can be regulated, and by tightening them they will remain in that relation, except when acted upon by pressure being brought against the stales by the animal trying to mount a fence.

The throat-latch E is provided with a series of holes and a buckle, for the purpose of adjusting it to the necks of different-sized animals.

The bow or yoke should be nicely rounded on its inner or under side, to prevent wearing the mane from the animal's neck.

Having described our invention, what we claim, and desire to secure by Letters Patent, is—

1. In an animal-poke, the combination and arrangement of the bow B, adjusting device F, and the frame carrying the pins, substantially as set forth.

2. The combination of the shield-bar A, cross-bar C, pin G, and nut D, substantially as described and set forth.

3. An animal-poke composed of the bow B, shield-bar A, adjustable frame carrying the pins, throat-latch E, adjusting device F, pin G, with nut D, all combined and arranged to operate in the manner and for the purposes set forth and described.

In testimony that we claim the foregoing as our own we affix our signatures in presence of two witnesses.

A. LARROWE.
ERWIN LARROWE.

Witnesses:
CHAS. LARROWE,
M. H. MORGAN.